United States Patent
Jiang

(10) Patent No.: US 11,991,719 B2
(45) Date of Patent: *May 21, 2024

(54) METHOD AND DEVICE FOR ALLOCATING UPLINK RESOURCE, AND TERMINAL

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,288

(22) Filed: Jul. 13, 2022

(65) Prior Publication Data
US 2022/0353903 A1   Nov. 3, 2022

Related U.S. Application Data

(63) Continuation of application No. 16/639,738, filed as application No. PCT/CN2017/098159 on Aug. 18, 2017, now Pat. No. 11,419,138.

(51) Int. Cl.
| H04W 72/23 | (2023.01) |
| H04W 72/0446 | (2023.01) |
| H04W 72/0453 | (2023.01) |
| H04W 72/21 | (2023.01) |
| H04W 72/56 | (2023.01) |

(52) U.S. Cl.
CPC ....... *H04W 72/23* (2023.01); *H04W 72/0446* (2013.01); *H04W 72/0453* (2013.01); *H04W 72/21* (2023.01); *H04W 72/56* (2023.01)

(58) Field of Classification Search
CPC ............. H04W 72/23; H04W 72/0446; H04W 72/0453; H04W 72/21; H04W 72/56; H04W 72/542; H04L 5/00; H04L 5/0053
See application file for complete search history.

(56) References Cited

U.S. PATENT DOCUMENTS

| 2011/0051694 | A1  | 3/2011 | Cho et al. |
| 2015/0264631 | A1* | 9/2015 | Zhang .................... H04W 72/23 370/329 |
| 2016/0165466 | A1  | 6/2016 | Kim et al. |
| 2020/0170035 | A1* | 5/2020 | Lee ........................ H04W 72/56 |

(Continued)

FOREIGN PATENT DOCUMENTS

CN    106961741 A    7/2017

OTHER PUBLICATIONS

International search report of PCT application No. PCT/CN2017/098159 mailed on May 18, 2018.
(Continued)

*Primary Examiner* — Chi H Pham
*Assistant Examiner* — Raul Rivas
(74) *Attorney, Agent, or Firm* — Syncoda LLC; Feng Ma

(57) ABSTRACT

A method for allocating an uplink resource includes: receiving, by a terminal, an uplink (UL) grant sent by a base station; and allocating, by the terminal, based on a transmission profile, an uplink resource indicated by an UL grant to a logical channel; wherein the transmission profile corresponding to the logical channel and the UL grant, and the transmission profile is configured by the base station in LogicalChannelConfig.

12 Claims, 5 Drawing Sheets

(56) References Cited

U.S. PATENT DOCUMENTS

2020/0267753 A1* 8/2020 Adjakple .......... H04W 72/1268

OTHER PUBLICATIONS

Ericsson, Logical Channel Prioritisation and Multiple Numerologies, 3GPP TSG-RAN WG2 #98, Tdoc R2-1704397, May 6, 2017 (May 6, 2017), pp. 2, sections 2.2 and 2.3.
Ericsson, Logical Channel Prioritization and Transmission Profiles, 3GPP TSG-RAN WG2 #99, Tdoc R2-1709474, Aug. 11, 2017 (Aug. 11, 2017), pp. 2 and 3, sections 2.1 and 2.2.
Non-final office Action of U.S. Appl. No. 16/639,738 mailed on Jan. 6, 2022.
Notice of allowance of U.S. Appl. No. 16/639,738 mailed on Apr. 13, 2022.

* cited by examiner

METHOD AND DEVICE FOR ALLOCATING UPLINK RESOURCE, AND TERMINAL

CROSS-REFERENCE TO RELATED APPLICATIONS

This is a continuation of U.S. patent application Ser. No. 16/639,738 filed on Feb. 17, 2020, which is a national stage of International Application No. PCT/CN2017/098159 filed on Aug. 18, 2017. The disclosures of the above-referenced applications are hereby incorporated by reference in their entirety.

BACKGROUND

In the process of wireless communication, if a terminal needs to send data to a base station, the base station needs to allocate an uplink resource to the terminal first. Then, the terminal sends the data to the base station using the allocated uplink resource. On the terminal side, there may be data, from a plurality of logical channels, that need to be sent to the base station. Therefore, the terminal allocated with the uplink resource needs to decide the data from which logical channel is to be transmitted by the allocated uplink resource and how much data each logical channel can transmit.

SUMMARY

Embodiments of the present disclosure relate to the field of communication technology, and in particular to a method and a device for allocating an uplink resource and a terminal.

To solve problems in the related art, embodiments of the present disclosure provide a method and a device for allocating an uplink resource and a terminal. The technical solutions are described as below.

According to a first aspect of the embodiments of the present disclosure, there is provided a method for allocating an uplink resource. The method includes: receiving a UL grant sent by a base station; and allocating, based on a transmission profile corresponding to a logical channel, an uplink resource indicated by the UL grant to the logical channel. The transmission profile corresponding to the logical channel is allocated by the base station.

In some embodiments, said allocating, based on a transmission profile corresponding to a logical channel, an uplink resource indicated by the UL grant to the logical channel includes: determining a transmission profile corresponding to the uplink resource indicated by the received UL grant; and allocating, based on the transmission profile corresponding to the logical channel and the transmission profile corresponding to the uplink resource, an uplink resource indicated by the UL grant to the logical channel.

By determining the transmission profile corresponding to the uplink resource indicated by the UL grant, the uplink resource that meets the transmission profile corresponding to the logical channel may be selected and allocated to the corresponding logical channel.

In some embodiments, the uplink resource indicated by each of the UL grants includes one or a plurality of time-frequency resource blocks. Each time-frequency resource block corresponds to one transmission profile. During implementation, the uplink resources in one UL grant may correspond to the same transmission profile or different transmission profiles. Thus, one UL grant may indicate the uplink resources corresponding to different transmission profiles, which can be implemented flexibly.

In some embodiments, said determining a transmission profile corresponding to the uplink resource indicated by the received UL grant includes: acquiring an identifier of a transmission profile corresponding to the uplink resource from the UL grant, and determining, based on the identifier of the transmission profile, the transmission profile corresponding to the uplink resource. Alternatively, said determining a transmission profile corresponding to the uplink resource indicated by the received UL grant includes: acquiring a transmission profile parameter corresponding to the uplink resource from the UL grant, and determining, based on the acquired transmission profile parameter, the transmission profile corresponding to the uplink resource. The transmission profile corresponding to the uplink resource is determined by information the UL grant carries, which is simple to implement.

In some embodiments, said allocating, based on a transmission profile corresponding to a logical channel, an uplink resource indicated by the UL grant to the logical channel further includes:
judging whether a transmission profile corresponding to an uplink resource indicated by the UL grant belongs to a pre-allocated transmission profile set, wherein the transmission profile set includes a transmission profile corresponding to the logical channel; and if not, not allocating an uplink resource corresponding to the transmission profile that does not belong to the transmission profile set, or determining a priority of the transmission profile that does not belong to the transmission profile set as a minimum priority.

During resource allocation, the priority of the transmission profile that belongs to the pre-allocated transmission profile set serves as a priority of the transmission profile corresponding to the uplink resource. For the transmission profile that does not belong to the transmission profile set, the priority of the transmission profile corresponding to the uplink resource serves as the minimum priority, such that the uplink resource allocated to the logical channel can be conveniently determined during subsequent resource allocation.

In a possible implementation mode of the present disclosure, the logical channel corresponds to one transmission profile. Said allocating, based on the transmission profile corresponding to the logical channel and the transmission profile corresponding to the uplink resource, an uplink resource indicated by the UL grant to the logical channel includes: when a first uplink resource exists, and the quantity of the first uplink resource is larger than or equal to the quantity of resources required by a first logical channel, allocating an uplink resource to the first logical channel from the first uplink resource. The first uplink resource is an unallocated uplink resource of which a corresponding transmission profile is the same as a transmission profile corresponding to the first logical channel. The first logical channel is any one of the logical channels allocated with a corresponding transmission profile.

Further, said allocating, based on the transmission profile corresponding to the logical channel and the transmission profile corresponding to the uplink resource, an uplink resource indicated by the UL grant to the logical channel further includes: when the first uplink resource does not exist or the quantity of the first uplink resource is smaller than the quantity of resources required by the first logical channel, the uplink resource for whose allocation the first uplink resource is insufficient is allocated by any one of the following ways:

allocating an uplink resource to the first logical channel from a second uplink resource, wherein the second uplink resource is an unallocated uplink resource of which a priority of a corresponding transmission profile is higher than that of the transmission profile corresponding to the first logical channel; or allocating an uplink resource to the first logical channel from a third uplink resource, wherein the third uplink resource is an unallocated uplink resource of which a priority of a corresponding transmission profile is lower than that of the transmission profile corresponding to the first logical channel; or allocating an uplink resource to the first logical channel from a fourth uplink resource, wherein the fourth uplink resource is an unallocated uplink resource of which a priority of a corresponding transmission profile is equal to that of the transmission profile corresponding to the first logical channel; or stopping allocating an uplink resource to the first logical channel.

In a possible implementation mode of the present disclosure, when the logical channel corresponds to a plurality of transmission profiles, said allocating, based on the transmission profile corresponding to the logical channel and the transmission profile corresponding to the uplink resource, an uplink resource indicated by the UL grant to the logical channel includes:

selecting and allocating an uplink resource corresponding to a transmission profile to a first logical channel in the order of priorities of a plurality of transmission profiles, from high to low, corresponding to the logical channel. The first logical channel is any of the logical channels allocated with the corresponding transmission profile.

Further, said allocating, based on the transmission profile corresponding to the logical channel and the transmission profile corresponding to the uplink resource, an uplink resource indicated by the UL grant to the logical channel includes:

when the uplink resources corresponding to the plurality of transmission profiles corresponding to the logical channel are insufficient to meet the demand on the quantity of resources required by the logical channel, allocating an uplink resource to the logical channel by the following ways:

allocating an uplink resource corresponding to a transmission profile other than the transmission profile corresponding to the logical channel to the logical channel; or after allocating uplink resources, based on the plurality of corresponding allocated transmission profiles, to all the logical channels once, allocating an uplink resource corresponding to a transmission profile other than the transmission profile corresponding to the logical channel to the logical channel; or stopping allocating an uplink resource to the logical channel.

In some embodiments, said allocating, based on the transmission profile corresponding to the logical channel and the transmission profile corresponding to the uplink resource, an uplink resource indicated by the UL grant to the logical channel further includes: allocating an uplink resource to a second logical channel in the order of the priority of the transmission profile corresponding to the uplink resource from high to low or from low to high. The second logical channel is a logical channel unallocated with a corresponding transmission profile. The base station needs to allocate a transmission profile priority to only a logical channel corresponding to a specific service (e.g., services with demands on a TTI and a sub-carrier spacing) but not all the logical channels. For other services, the terminal may allocate resources to them pursuant to a set rule.

In some embodiments, said allocating, based on a transmission profile corresponding to a logical channel and a transmission profile corresponding to the uplink resource, an uplink resource indicated by the UL grant to the logical channel further includes: allocating, based on a default transmission profile and a transmission profile corresponding to the uplink resource, an uplink resource to a second logical channel. The second logical channel is a logical channel unallocated with a corresponding transmission profile. The default transmission profile is pre-allocated by the base station.

In some embodiments, the method further comprises: receiving transmission profile allocation information sent by a base station, wherein the transmission profile allocation information comprises at least one of indication information of a default transmission profile, indication information of a transmission profile set and indication information of a transmission profile corresponding to a logical channel; the indication information of the default transmission profile is configured to indicate a transmission profile preferentially used by a logical channel unallocated with a corresponding transmission profile; and the transmission profile set comprises a transmission profile corresponding to the logical channel.

According to a second aspect of the embodiments of the present disclosure, there is provided a device for allocating an uplink resource, comprising:

a receiving unit, configured to receive a UL grant sent by a base station; and an allocating unit, configured to allocate, based on a transmission profile corresponding to a logical channel, an uplink resource indicated by the UL grant the receiving unit receives to the logical channel, wherein the transmission profile corresponding to the logical channel is allocated by the base station.

In some embodiments, the allocating unit comprises:

a determining sub-unit, configured to determine a transmission profile corresponding to the uplink resource indicated by the received UL grant; and an allocating sub-unit, configured to allocate, based on the transmission profile corresponding to the logical channel and the transmission profile corresponding to the uplink resource, an uplink resource indicated by the UL grant to the logical channel.

In some embodiments, the uplink resource indicated by each of the UL grants comprises one or a plurality of time-frequency resource blocks, and each time-frequency resource block corresponds to one transmission profile.

In some embodiments, the determining sub-unit is configured to acquire an identifier of a transmission profile corresponding to the uplink resource from the UL grant, and determine the transmission profile corresponding to the uplink resource based on the identifier of the transmission profile; or the determining sub-unit is configured to acquire a transmission profile parameter corresponding to the uplink resource from the UL grant, and determine the transmission profile corresponding to the uplink resource based on the acquired transmission profile parameter.

In some embodiments, the allocating unit further comprises:

a judging sub-unit, configured to judge whether a transmission profile corresponding to an uplink resource indicated by the UL grant belongs to a pre-allocated transmission profile set, wherein the transmission profile set comprises a transmission profile corresponding to the logical channel; and a priority determining sub-unit, configured not to, if the judging sub-unit determines that the transmission profile corresponding to the uplink resource indicated by the UL grant does not belong to a pre-allocated transmission profile set, allocate an uplink resource corresponding to the transmission profile that does not belong to the transmission profile set, or determine a priority of the transmission profile that does not belong to the transmission profile set as a minimum priority.

In some embodiments, the logical channel corresponds to one or a plurality of transmission profiles.

In some embodiments, when the logical channel corresponds to one transmission profile, the allocating sub-unit is configured to, when a first uplink resource exists, and the quantity of the first uplink resource is larger than or equal to the quantity of resources required by a first logical channel, allocate an uplink resource to the first logical channel from the first uplink resource; the first uplink resource is an unallocated uplink resource of which a corresponding transmission profile is the same as a transmission profile corresponding to the first logical channel, and the first logical channel is any one of the logical channels allocated with a corresponding transmission profile.

Further, the allocating sub-unit is further configured to, when the first uplink resource does not exist or the quantity of the first uplink resource is smaller than the quantity of resources required by the first logical channel, the uplink resource for whose allocation the first uplink resource is insufficient is allocated by any one of the following ways:

allocating an uplink resource to the first logical channel from a second uplink resource, wherein the second uplink resource is an unallocated uplink resource of which a priority of a corresponding transmission profile is higher than that of the transmission profile corresponding to the first logical channel; or allocating an uplink resource to the first logical channel from a third uplink resource, wherein the third uplink resource is an unallocated uplink resource of which a priority of a corresponding transmission profile is lower than that of the transmission profile corresponding to the first logical channel; or allocating an uplink resource to the first logical channel from a fourth uplink resource, wherein the fourth uplink resource is an unallocated uplink resource of which a priority of a corresponding transmission profile is equal to that of the transmission profile corresponding to the first logical channel; or stopping allocating an uplink resource to the first logical channel.

In some embodiments, when the logical channel corresponds to a plurality of transmission profiles, the allocating sub-unit is configured to, select and allocate an uplink resource corresponding to a transmission profile to a first logical channel in the order of priorities of a plurality of transmission profiles, from high to low, corresponding to the logical channel; and the first logical channel is any one of the logical channels allocated with the corresponding transmission profile.

Further, the allocating sub-unit is further configured to, when the uplink resources corresponding to the plurality of transmission profiles corresponding to the logical channel are insufficient to meet the demand on the quantity of resources required by the logical channel, allocate an uplink resource to the logical channel by the following ways:

allocating an uplink resource corresponding to a transmission profile other than the transmission profile corresponding to the logical channel to the logical channel; or after allocating uplink resources, based on the plurality of corresponding allocated transmission profiles, to all the logical channels once, allocating an uplink resource corresponding to a transmission profile other than the transmission profile corresponding to the logical channel to the logical channel; or stopping allocating an uplink resource to the logical channel.

In some embodiments, the allocating unit is further configured to, allocate an uplink resource to a second logical channel in the order of the priority of the transmission profile corresponding to the uplink resource from high to low or from low to high; and the second logical channel is a logical channel unallocated with the transmission profile.

In some embodiments, the allocating unit is further configured to allocate, based on a default transmission profile and a transmission profile corresponding to the uplink resource, an uplink resource to a second logical channel; the second logical channel is a logical channel unallocated with a corresponding transmission profile; and the default transmission profile is pre-allocated by the base station.

In some embodiments, the receiving unit is further configured to receive transmission profile allocation information sent by a base station; the transmission profile allocation information comprises at least one of indication information of a default transmission profile, indication information of a transmission profile set and indication information of a transmission profile corresponding to a logical channel; the indication information of the default transmission profile is configured to indicate a transmission profile preferentially used by a logical channel unallocated with a corresponding transmission profile; and the transmission profile set comprises a transmission profile corresponding to the logical channel.

According to a third aspect of the embodiments of the present disclosure, there is provided a terminal, comprising: a processor; and a memory configured to store an instruction executable by the processor, wherein the processor is configured to: receive a UL grant sent by a base station; and allocate, based on a transmission profile corresponding to a logical channel, an uplink resource indicated by the UL grant to the logical channel, wherein the transmission profile corresponding to the logical channel is allocated by the base station.

The technical solutions provided by the embodiments of the present disclosure may have the following beneficial effects.

By allocating the corresponding transmission profile to the logical channel, the uplink resource that meets the transmission profile of the logical channel can be preferentially allocated to the logical channel. Thus, transmission of data on the logical channel can be guaranteed better to meet requirements of communication services.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The embodiments of the present disclosure will be described in further detail with reference to the accompanying drawings, to present the objects, technical solutions, and advantages of the present disclosure more clearly.

The symbol "/" in this text generally represents an "or" relationship between contextual objects.

In some implementations, the terminal allocates the uplink resource to the logical channels based on a priority and a priority bit rate of each logical channel. However, in a 5G communication system, data transmission of different logical channels may have different requirements for a sub-carrier spacing and a transmission time interval (TTI). The foregoing method of allocating the uplink resource to the logical channels based on the priority and the priority bit rate of each logical channel fails to meet actual demands.

Figure 1:
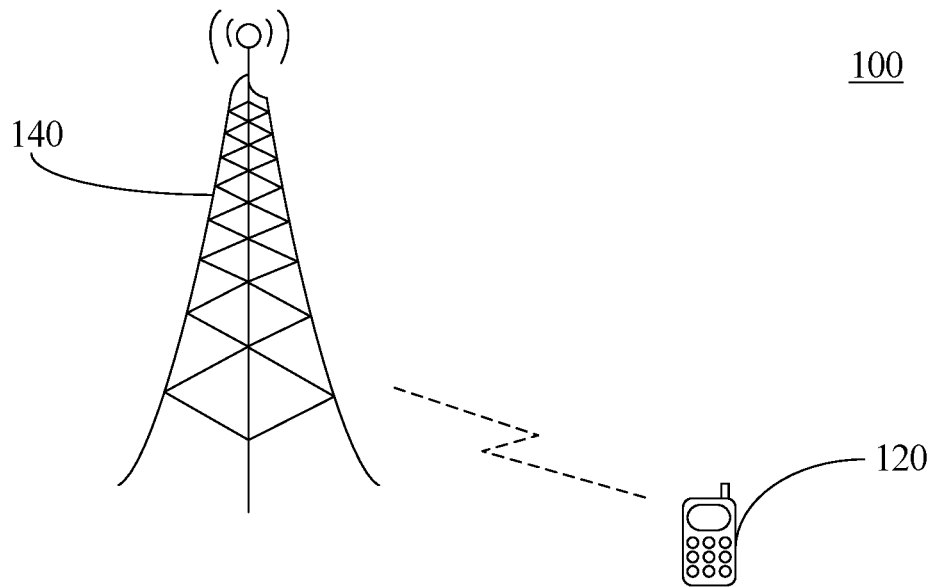
FIG. 1 is a system architecture diagram of a communication system in accordance with one embodiment of the present disclosure.

Referring to FIG. 1, which is a system architecture diagram of a communication system in accordance with one embodiment of the present disclosure. The communication system 100 includes at least one terminal 120 and at least one access network apparatus 140.

The terminal 120 may be a personal communication service (PCS) telephone, a cordless telephone, a session initiation protocol (SIP) telephone, and a wireless local loop (WLL) station, a personal digital assistant (PDA), etc. The terminal may also be called a system, a subscriber unit, a subscriber station, a mobile station, a mobile, a remote station, an access point, a remote terminal, an access terminal, a user terminal, a user agent, a user device, or user equipment.

The terminal 120 communicates with one or a plurality of access network apparatuses 140 by a radio access network (RAN).

The access network apparatus 140 serves as a router between the terminal 120 and the rest of an access network. The rest of the access network may include an Internet protocol network. The access network apparatus 140 may also coordinate attribute management of an air interface. For example, the access network apparatus 140 may be a base transceiver station (BTS) in a global system for mobile communication (GSM) or a code division multiple access (CDMA) system, a base station (NodeB) in a wideband code division multiple access (WCDMA) system, or an eNB in an LTE or fifth generation (5G) communication system, which will not be limited by the present disclosure.

It should be noted that in the embodiment of the present disclosure, uplink refers to transmission from the terminal to the access network apparatus via a wireless interface.

In the embodiment of the present disclosure, to make the terminal 120 send data to the access network apparatus 140, the access network apparatus 140 needs to allocate an uplink resource to the terminal 120 first. The uplink resource may include a time-frequency resource, a code resource, etc. After that, the terminal 120 sends the data to the access network apparatus 140 using the allocated uplink resource.

Since each terminal 120 may need to transmit various business data simultaneously, and different business data is usually transmitted by different logical channels, after acquiring the uplink resource allocated by the access network apparatus 140, the terminal 120 needs to allocate the uplink resource to all the logical channels to transmit the data of the logical channels.

In a 5G communication system, a new radio (NR) can support transmission with different sub-carrier spacing and/or TTI, or power requirements. Each possible transmission mode can be called a transmission profile. Different logical channels may have different requirements for sub-carrier spacing, TTI, etc. Therefore, during allocation of the uplink resource, different transmission requirements of different logical channels need to be considered to better perform data transmission.

For example, since the ultra-reliable low-latency communication (URLLC) service requires a small TTI, the transmission profile that meets the requirement on TTI can be allocated to the logical channel corresponding to the URLLC service. During allocation of the uplink resource, the uplink resource of which the corresponding transmission profile is the same as the transmission profile corresponding to the logical channel may be preferentially allocated to the logical channel to ensure that the high demand of the service on time delay is met.

Embodiments of the present disclosure take that a method for allocating an uplink resource is applied to the terminal 120 and the access network apparatus 140 (hereinafter referred to as a base station) shown in FIG. 1 as an example for schematic explanation.

Figure 2:
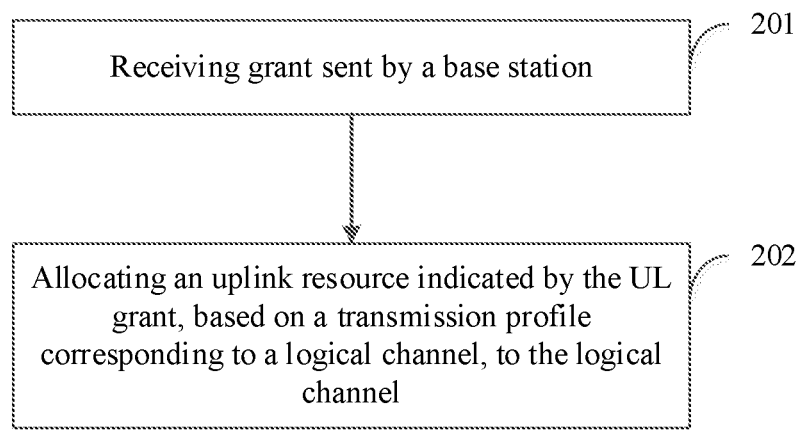
FIG. 2 is a flowchart of a method for allocating an uplink resource in accordance with one embodiment of the present disclosure.

Referring to FIG. 2, which is a flowchart of a method for allocating an uplink resource in accordance with one embodiment of the present disclosure. The present embodiment takes that the method for allocating the uplink resource is applied to the terminal 120 shown in FIG. 1 as an example for explanation. The method includes the following steps.

In step 201, a U: grant sent by a base station is received.

The UL grant generally includes a terminal identifier, resource allocation information, a transformant (e.g., a modulation and coding scheme (MCS)), etc., and is configured to inform the terminal on which time-frequency resources and how data can be sent.

In step 202, an uplink resource indicated by the UL grant is allocated, based on a transmission profile corresponding to a logical channel, to the logical channel.

The transmission profile corresponding to the logical channel may be allocated by the base station, for example, using a radio resource control (RRC) message in a building process of a radio bearer. Each transmission profile includes an identifier/index, a sub-carrier spacing (or numerology), a TTI and a transmission profile priority, and may further include a watt level, etc. One logical channel may correspond to one or a plurality of transmission profiles.

In the present embodiment, by allocating the corresponding transmission profile to the logical channel, the uplink resource that meets the transmission profile of the logical channel can be preferentially allocated to the logical channel. Thus, transmission of the data on the logical channel can be better guaranteed to meet requirements of communication services.

Figure 3:
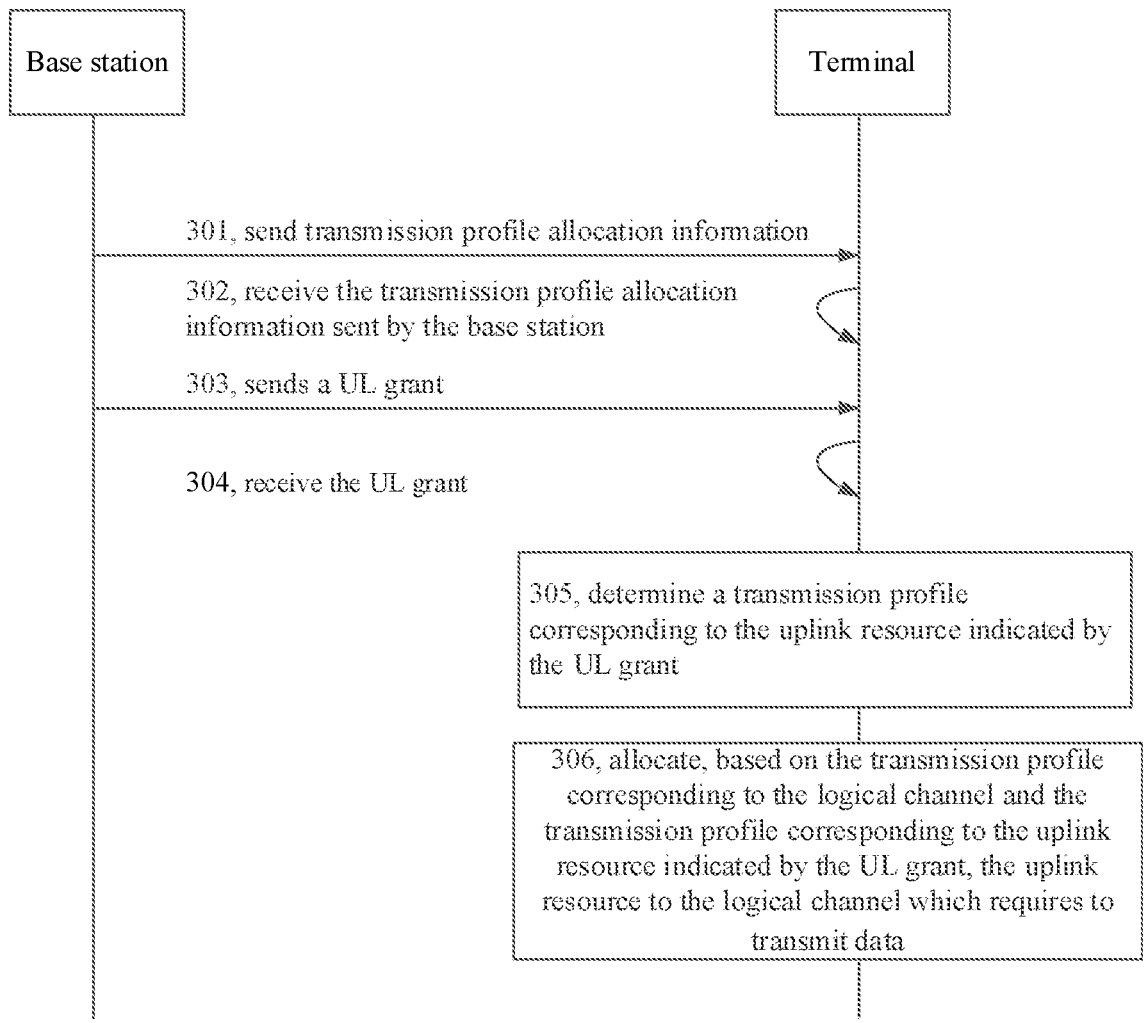
FIG. 3 is a flowchart of a method for allocating an uplink resource in accordance with another embodiment of the present disclosure.

Referring to FIG. 3, which is a flowchart of a method for allocating an uplink resource in accordance with one embodiment of the present disclosure. The present embodiment takes that the method for allocating the uplink resource is applied to a communication system shown in FIG. 1 as an example for explanation. In the present embodiment, one logical channel is allocated with one corresponding transmission profile. The method includes the following steps.

In step 301, a base station sends transmission profile allocation information.

The transmission profile allocation information includes indication information of one transmission profile set, which includes identifiers of transmission profiles in the transmission profile set and a priority of each transmission profile. One transmission profile set includes at least two transmission profiles. The transmission profile set is based on a terminal. That is, each terminal corresponds to one transmission profile set. Different terminals may correspond to the same or different transmission profiles in the transmission profile set.

In a possible implementation mode, the base station and the terminal can appoint a plurality of transmission profiles through a protocol. Each transmission profile includes an identifier/index, a sub-carrier spacing (or numerology), a TTI, etc. In this case, the transmission profile allocation information sent by the base station may only include the identifiers of the transmission profiles in the set and the priority of each transmission profile.

In another possible implementation mode, the transmission profile allocation information sent by the base station includes the transmission profiles in the set and the priority of each transmission profile.

It should be noted that in the present embodiment, the indication information of the transmission profile set includes the priority of each transmission profile in the transmission profile set, such that each terminal may allocate different priorities to the same transmission profile. In other embodiments, if all the terminals adopt the same priority for the same transmission profile, the indication information of the transmission profile set may not include the priority of the transmission profile.

In some embodiments, the transmission profile allocation information may further include indication information of the transmission profile corresponding to the logical channel. The transmission profile corresponding to the logical channel may be a transmission profile that the logical channel tends to use. The indication information of the transmission profile corresponding to the logical channel may directly include the transmission profile that the logical channel tends to use, and may also include an identifier of the transmission profile that the logical channel tends to use, e.g., an index of the transmission profile that the logical channel tends to use in the transmission profile set.

During implementation, the transmission profile allocation information may be sent by an RRC message that may be sent in a building process of a radio bearer.

Further, the indication information of the transmission profile corresponding to the logical channel may be carried in a logical channel configuration allocated to the radio bearer to be sent. In addition to a transmission profile priority, the logical channel configuration may further include a logical channel priority, a prioritized bit rate (PBR), a bucket size duration (BSD), etc. Further, the building process of the radio bearer may be a building process of a radio bearer during establishment of a connection, and may also be a building process of a radio bearer after establishment of the connection. For example, the radio bearer is built for data transmission of new services.

In some embodiments, the indication information of the transmission profile corresponding to the logical channel and the indication information of the transmission profile set may be sent by the same RRC message and may also be sent by different RRC messages.

During implementation, the same transmission profile priority may correspond to one or a plurality of transmission profiles, which may be set according to actual needs.

In step 302, the terminal receives the transmission profile allocation information sent by the base station.

It is easy to know that after receiving the allocation information sent by the base station, the terminal will store it for later use.

In step 303, the base station sends a UL grant to the terminal.

The UL grant generally includes a terminal identifier, resource allocation information, a transformant (e.g., MCS), etc. In the present embodiment, the UL grant may further include information of a transmission profile corresponding to the UL grant, e.g., an identifier of the transmission profile, or a transmission profile parameter (e.g., a TTI and a sub-carrier spacing).

During implementation, one UL grant may correspond to one or a plurality of transmission profiles, which can be determined by the base station based on actual needs. Further, one UL grant may carry allocation information of a plurality of time-frequency resource blocks and a transmission profile corresponding to each time-frequency resource block. The plurality of time-frequency resource blocks in the UL grant may correspond to the same transmission profile, and at this time, the UL grant corresponds to one transmission profile. Alternatively, the plurality of time-frequency resource blocks in the UL grant may correspond to different transmission profiles, and then, the UL grant corresponds to a plurality of transmission profiles. In this case, the UL grant may indicate uplink resources corresponding to priorities of the different transmission profiles, which can be implemented flexibly.

The transmission profiles corresponding to the plurality of UL grants may be partially or totally the same or totally different.

In step 304, the terminal receives the UL grant.

In step 304, the terminal may receive one or a plurality of UL grants. During implementation, the terminal may support a plurality of carriers, can transmit data on the plurality of carriers, and therefore can receive the UL grants on the plurality of carriers respectively to obtain the plurality of UL grants.

In step 305, the terminal determines a transmission profile corresponding to the uplink resource indicated by the UL grant.

In the present embodiment, since the UL grant includes the information of the transmission profile corresponding to the UL grant, the terminal can directly acquire the information of the transmission profile corresponding to the UL grant from the UL grant to determine the priority of the transmission profile corresponding to each UL grant.

In some embodiments, step 305 may include: acquiring an identifier of a transmission profile corresponding to the uplink resource from the UL grant (it may be realized by a physical layer of the terminal), and determining, based on the identifier of the transmission profile, the transmission profile corresponding to the uplink resource (it can be realized by an MAC layer of the terminal).

Alternatively, step 305 may include: acquiring a transmission profile parameter corresponding to the uplink resource from the UL grant (it may be realized by a physical layer of the terminal), and determining, based on the acquired transmission profile parameter, a transmission profile corresponding to the uplink resource (it may be realized by an MAC layer of the terminal).

In step 305, the transmission profile corresponding to the uplink resource is determined by the information carried by the UL grant, which is simple to implement.

In step 306, the terminal allocates, based on the transmission profile corresponding to the logical channel and the transmission profile corresponding to the uplink resource indicated by the UL grant, the uplink resource to the logical channel which requires to transmit data.

In some embodiments, the terminal can sequentially allocate the uplink resource to all the logical channels that require to transmit data in the order of the logical channel priority from high to low. That is, the terminal allocates the uplink resource to the logical channel with a high logical channel priority first, and then, allocates the uplink resource to the logical channel with a secondary high logical channel priority, and so forth.

During allocation of the uplink resource, a first uplink resource is preferentially allocated to a first logical channel. The first logical channel is a logical channel allocated with the corresponding transmission profile and requiring to transmit data. The first uplink resource is an unallocated uplink resource of which a corresponding transmission profile is the same as a transmission profile of the first logical channel. Thus, step 306 may include: when a first uplink resource exists and the quantity of the first uplink resource is larger than or equal to a quantity of resources required by a first logical channel, allocating an uplink resource to the first logical channel from the first uplink resource.

In some embodiments, step 306 may further include:
when the first uplink resource does not exist or the quantity of the first uplink resource is smaller than the quantity of resources required by the first logical channel, all the first uplink resource is allocated to the first logical channel first, and then, the uplink resource for whose allocation the first uplink resource is insufficient is allocated by any of the following ways:
allocating an uplink resource to the first logical channel from a second uplink resource, wherein the second uplink resource is an unallocated uplink resource of which a priority of a corresponding transmission profile is higher than that of the transmission profile corresponding to the first logical channel; or
allocating an uplink resource to the first logical channel from a third uplink resource, wherein the third uplink resource is an unallocated uplink resource of which a priority of a corresponding transmission profile is lower than that of the transmission profile corresponding to the first logical channel; or
allocating an uplink resource to the first logical channel from a fourth uplink resource, wherein the fourth uplink resource is an unallocated uplink resource of which a priority of a corresponding transmission profile is equal to that of the transmission profile corresponding to the first logical channel; or
stopping allocating an uplink resource to the first logical channel.

In practice, for the first uplink resource that is insufficient to allocate, an uplink resource is allocated to the first logical channel from other uplink resources (e.g., the second uplink resource, the third uplink resource or the fourth uplink resource) as soon as all the first uplink resource is allocated to the first logical channel, or, an uplink resource is allocated to the first logical channel from other uplink resources after the uplink resource corresponding to the corresponding transmission profile is allocated to all the logical channels.

Further, the uplink resource may be allocated to the first logical channel from the second uplink resource in the order (from high to low or from low to high) of the priority of the transmission profile corresponding to the uplink resource. For example, the uplink resource corresponding to the transmission profile with the highest priority may be selected from the second uplink resource first, and whether the selected uplink resource meets the quantity of resources required by the first logical channel is judged. If yes, the uplink resource is allocated to the first logical channel from the uplink resource corresponding to the transmission profile with the highest priority. If not, the uplink resource corresponding to the selected priority is allocated to the first logical channel first, then, an uplink resource corresponding to the transmission profile with the secondary high priority is selected from the second uplink resource, whether the selected uplink resource meets the quantity of rest resources required by the first logical channel is judged, and so forth till all the uplink resources indicated by the UL grant are allocated or the uplink resources are allocated to all data required to be transmitted by the logical channels. Certainly, the uplink resource may also be randomly selected from the second uplink resource and allocated to the first logical channel in addition to the high-low order of the priority of the transmission profile corresponding to the uplink resource.

The way in which the uplink resource is allocated to the first logical channel from the third uplink resource is similar to that in which the uplink resource is allocated to the first logical channel from the second uplink resource, and therefore, will not be described in detail herein.

Since in the foregoing process of allocating the uplink resource, whether the quantity of the uplink resource corresponding to a certain transmission profile meets the quantity of resources required by the first logical channel needs to be judged, the terminal also needs to calculate the sum of the uplink resources corresponding to the transmission profiles. Every time the uplink resource is allocated, the quantity of the allocated uplink resources is subtracted from the corresponding sum to obtain the quantity of the unallocated uplink resources.

It should be noted that similar to a long-term evolution (LTE) system, the terminal may also adopt a two-round method to allocate the uplink resource to the logical channel.

If the two-round method is adopted to allocate the uplink resource to the logical channel, step 307 may include the following sub-steps.

The first round of resource allocation is performed based on a PBR of each logical channel. If there are some uplink resources indicated by the UL grant remaining after the first round of resource allocation, the second round of resource allocation is performed on the logical channel that requires to transmit remaining data, till the uplink resources indicated by the UL grant are all allocated or the uplink resources are allocated to all data required to be transmitted by the logical channel.

In the first round of resource allocation, the quantity of resources required by each logical channel is determined by the PBR. At this time, when the first uplink resource does not exist or the quantity of the first uplink resource is smaller than the quantity of resources required by the first logical channel, allocation of the uplink resource to the first logical channel is stopped.

In the second round of resource allocation, the quantity of resources required by each logical channel is determined by the quantity of remaining data required to transmitted. At this time, when the first uplink resource does not exist or the quantity of the first uplink resource is smaller than the quantity of resources required by the first logical channel, the uplink resource will be allocated to the first logical channel from the second uplink resource or the third uplink resource till all the uplink resources indicated by the UL grant are allocated.

It should be noted that in the two rounds of allocation, when the first uplink resource exists and the quantity of the first uplink resource is larger than or equal to the quantity of resources required by the first logical channel, the uplink resource is naturally and preferentially allocated to the first logical channel from the first uplink resource. Thus, it is only emphasized the case that in the two rounds of resource allocation, the first uplink resource does not exist or the quantity of the first uplink resource is smaller than the quantity of resources required by the first logical channel.

Certainly, in another implementation mode of the present embodiment, the terminal may also adopt a one-round method to allocate resources to the logical channel.

Allocating the uplink resource indicated by the UL grant to the logical channel based on the transmission profile corresponding to the logical channel can be completed in steps 305 and 306. By determining the transmission profile corresponding to the uplink resource indicated by the UL grant, the uplink resource that meets the transmission profile corresponding to the logical channel may be selected and allocated to the corresponding logical channel.

In some embodiments, the base station may only allocate the corresponding transmission profile to part of the logical channels of the terminal. In the present embodiment, the logical channels unallocated with the transmission profile may be called the second logical channels. The uplink resource may be allocated to the second logical channel in the order of the priorities of the transmission profiles corresponding to the uplink resources from high to low or from low to high.

In some embodiments, the method provided by the present embodiment may further include: determining whether a transmission profile corresponding to an uplink resource indicated by the UL grant belongs to a pre-allocated transmission profile set; and if not, not allocating an uplink resource corresponding to the transmission profile that does not belong to the transmission profile set, or determining a priority of the transmission profile that does not belong to the transmission profile set as a minimum priority. If the transmission profile corresponding to the uplink resource indicated by the UL grant does not belong to the pre-allocated transmission profile set, a priority of a transmission profile in the transmission profile set serves as a priority of a transmission profile that belongs to the transmission profile set.

In the present embodiment, by allocating the corresponding transmission profile to the logical channel, the uplink resource that meets the transmission profile of the logical channel can be preferentially allocated to the logical channel. Thus, transmission of data on the logical channel can be guaranteed better to meet requirements of communication services.

Figure 4:
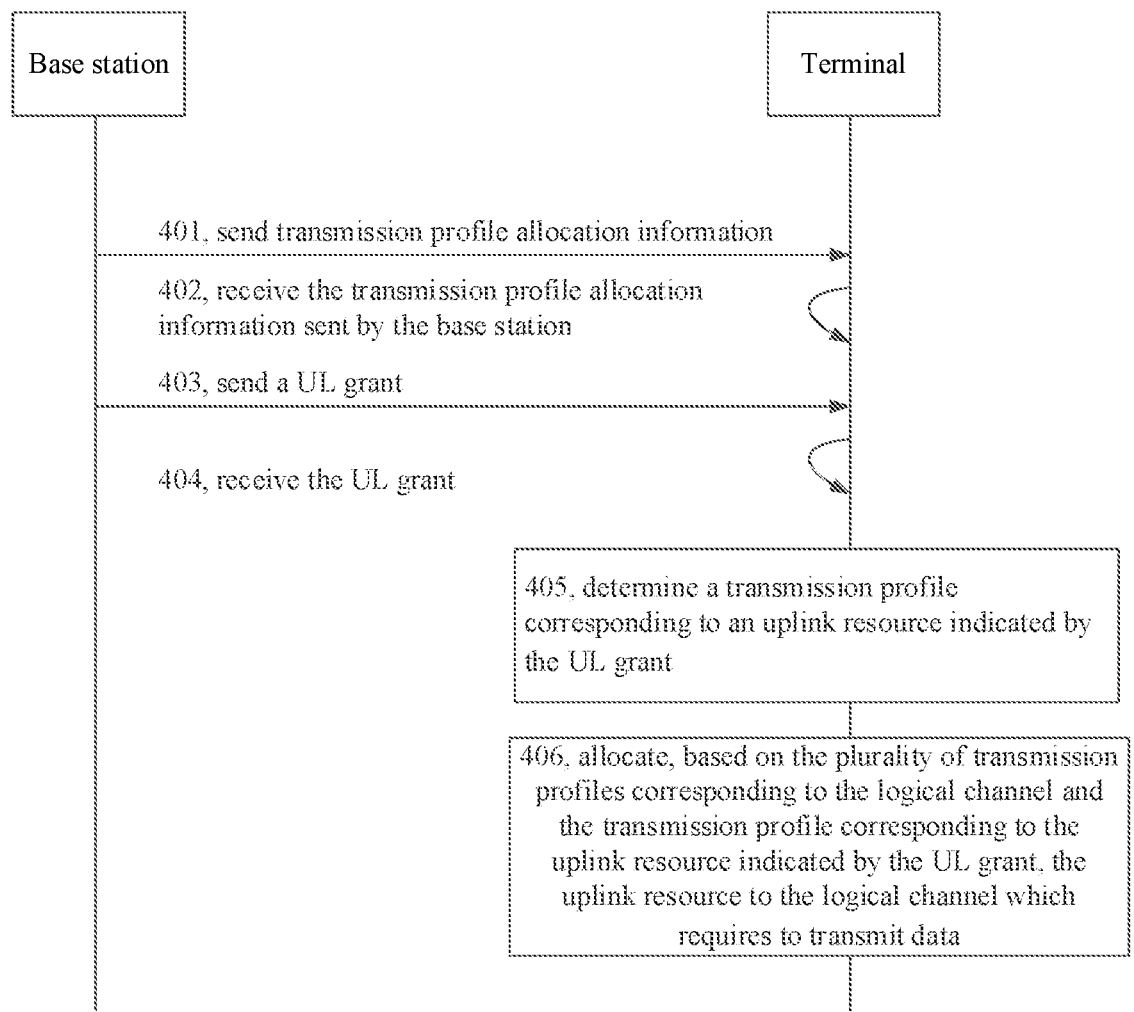
FIG. 4 is a flowchart of a method for allocating an uplink resource in accordance with yet another embodiment of the present disclosure.

Referring to FIG. 4, which is a flowchart of a method for allocating an uplink resource in accordance with one embodiment of the present disclosure. The present embodiment takes that the method for allocating the uplink resource is applied to a communication system shown in FIG. 1 as an example for explanation. In the present embodiment, one logical channel is allocated with at least two corresponding transmission profiles. The method includes the following steps.

In step 401, a base station sends transmission profile allocation information.

The transmission profile allocation information includes indication information of a transmission profile corresponding to at least one logical channel. The indication information of the transmission profile corresponding to the logical channel may directly include the transmission profile and may also include an identifier of a transmission profile that the logical channel tends to use. In the present embodiment, the logical channel corresponds to at least two transmission profiles. The indication information of the transmission profiles corresponding to the logical channel may further include priorities of the transmission profiles.

In a possible implementation mode, the base station and a terminal can appoint a plurality of transmission profiles through a protocol. Each transmission profile includes an identifier/index, a sub-carrier spacing (or numerology), a TTI, etc. In this case, the indication information of the transmission profile corresponding to the logical channel may include an identifier of the transmission profile corresponding to the logical channel and a priority of each transmission profile. For example, the indication information of transmission profiles corresponding to a logical channel 1 includes a transmission profile 0, a transmission profile 1 and a transmission profile 3 of which the priorities are respectively 1, 2 and 3. The indication information of transmission profiles corresponding to a logical channel 2 include a transmission profile 0, a transmission profile 2 and a transmission profile 5 of which the priorities are respectively 1, 2 and 3.

In another possible implementation mode, the indication information of the transmission profile corresponding to the logical channel include transmission profiles and a priority of each transmission profile.

It should be noted that in the present embodiment, the indication information of the transmission profile corresponding to the logical channel includes the priority of the transmission profile, such that different priorities may be allocated to the same transmission profile. Thus, the use is more flexible. In other embodiments, the same priority is adopted for the same transmission profile, the indication information of the transmission profile corresponding to the logical channel may not include the priority of the transmission profile.

During implementation, the transmission profile allocation information may be sent by an RRC message that may be sent in a building process of a radio bearer.

Further, the indication information of the transmission profile corresponding to the logical channel may be carried in a logical channel configuration allocated to the radio bearer to be sent. In addition to a transmission profile priority, the logical channel configuration may further include a logical channel priority, a prioritized bit rate (PBR), a bucket size duration (BSD), etc. Further, the building process of the radio bearer may be a building process of a radio bearer during establishment of a connection, and may also be a building process of a radio bearer after establishment of the connection. For example, the radio bearer is built for data transmission of new services.

In some embodiments, the transmission profile allocation information may further include indication information of a default transmission profile, which is configured to indicate a transmission profile preferentially used by a logical channel unallocated with a corresponding transmission profile. There may be one or a plurality of default transmission profiles. If there is a plurality of default transmission profiles, the indication information of the default transmission profile may further include a priority among the default transmission profiles.

In some embodiments, the indication information of the transmission profile corresponding to the logical channel and the indication information of the default transmission profile may be sent by the same RRC message and may also be sent by different RRC messages. Certainly, the base station may not send the indication information of the default transmission profile to the terminal. That is, the default transmission profile is not allocated.

In step 402, the terminal receives the transmission profile allocation information sent by the base station.

In step 403, the base station sends a UL grant to the terminal.

In step 404, the terminal receives the UL grant.

In step 405, the terminal determines a transmission profile corresponding to an uplink resource indicated by the UL grant.

Referring to steps 302 to 305 for the implementation modes of steps 402 to 405, which will not be described in detail herein.

In step 406, the terminal allocates, based on the plurality of transmission profiles corresponding to the logical channel and the transmission profile corresponding to the uplink resource indicated by the UL grant, the uplink resource to the logical channel which requires to transmit data.

In some embodiments, the terminal can sequentially allocate the uplink resource to all the logical channels that require to transmit data in the order of the logical channel priority from high to low. That is, the terminal allocates the uplink resource to the logical channel with a high logical channel priority first, and then, allocates the uplink resource to the logical channel with a secondary high logical channel priority, and so forth.

During allocation of the uplink resource, a first uplink resource is preferentially allocated to a first logical channel. The first logical channel is a logical channel allocated with the corresponding transmission profile and requiring to transmit data. The first uplink resource is an unallocated uplink resource of which a corresponding transmission profile is the same as a transmission profile of the first logical channel. Since the first logical channel corresponds to at least two transmission profiles in the present embodiment, step 406 may include:

selecting and allocating an uplink resource corresponding to a transmission profile to a first logical channel in the order of priorities of a plurality of transmission profiles, from high to low, corresponding to the logical channel.

Further, during allocation of the uplink resource to the first logical channel, the uplink resource corresponding to the transmission profile with the highest priority is selected from the plurality of corresponding transmission profiles and allocated to the first logical channel first. If the uplink resource corresponding to the transmission profile with the highest priority fails to meet the quantity of resources required by the first logical channel, the uplink resource corresponding to the transmission profile with the highest priority is allocated to the first logical channel first, then, an uplink resource corresponding to the transmission profile with the secondary high priority is selected and allocated to the first logical channel, and so forth till the first logical channel is allocated with enough resources or all the uplink resources corresponding to the plurality of transmission profiles are allocated to the first logical channel.

In some embodiments, step 406 may further include:
when the uplink resources corresponding to the plurality of transmission profiles corresponding to the logical channel are insufficient to meet the demand on the quantity of resources required by the logical channel, allocating an uplink resource to the logical channel by the following ways:
allocating an uplink resource corresponding to a transmission profile other than the transmission profile corresponding to the logical channel to the logical channel; or
after allocating uplink resources, based on the plurality of corresponding allocated transmission profiles, to all the logical channels once, allocating an uplink resource corresponding to a transmission profile other than the transmission profile corresponding to the logical channel to the logical channel; or
stopping allocating an uplink resource to the logical channel.

An uplink resource corresponding to a transmission profile other than the transmission profile corresponding to the logical channel may be allocated to the logical channel in the order of the priorities of the transmission profiles from high to low or from low to high. Alternatively, the transmission profiles are sequentially selected at random.

It should be noted that in the present embodiment, the terminal may also adopt a two-round method to allocate the uplink resource to the logical channel. Referring to step 306 for the two-round allocation method, which will not be described in detail herein. Certainly, the terminal may also adopt a one-round method to allocate the uplink resource to the logical channel.

In some embodiments, step 406 may further include: allocating, based on a default transmission profile and a transmission profile corresponding to the uplink resource, an uplink resource to a second logical channel. The second logical channel is a logical channel unallocated with a corresponding transmission profile.

If the base station allocates a plurality of default transmission profiles to the terminal, the uplink resource may be allocated to the second logical channel in the order of the priorities of the plurality of default transmission profiles from high to low. If the base station does not allocate a default transmission profile to the terminal, the terminal may optionally select and allocate the uplink resource to the second logical channel.

In the present embodiment, by allocating the corresponding transmission profile to the logical channel, the uplink resource that meets the transmission profile of the logical channel can be preferentially allocated to the logical channel. Thus, transmission of data on the logical channel can be guaranteed better to meet requirements of communication services.

Device embodiments of the present disclosure will be described below. Referring to the one-to-one corresponding method embodiments for details that are not described in the device embodiments.

Figure 5:
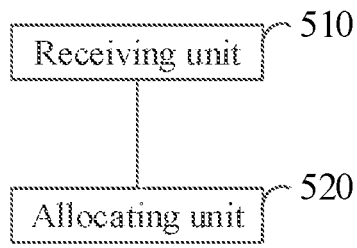
FIG. 5 is a structural block diagram of a device for allocating an uplink resource in accordance with one embodiment of the present disclosure.

Referring to FIG. 5, which is a structural block diagram of a device for allocating an uplink resource in accordance with one embodiment of the present disclosure. The device for allocating the uplink resource becomes all or part of the terminal 120 in FIG. 1 by hardware or a combination of hardware and software. The device includes a receiving unit 510 and an allocating unit 520.

The receiving unit 510 is configured to receive a UL grant sent by a base station. The allocating unit 520 is configured to allocate, based on a transmission profile corresponding to a logical channel, an uplink resource indicated by the UL grant the receiving unit 510 receives to the logical channel. The transmission profile corresponding to the logical channel is allocated by the base station.

Figure 6:
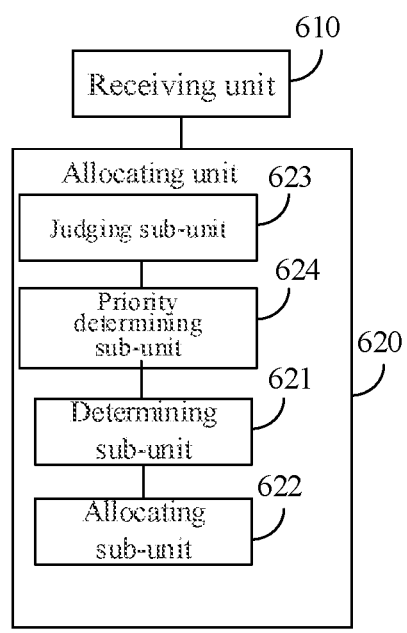
FIG. 6 is a structural block diagram of a device for allocating an uplink resource in accordance with another embodiment of the present disclosure.

Referring to FIG. 6, which is a structural block diagram of a device for allocating an uplink resource in accordance with one embodiment of the present disclosure.

Referring to FIG. 6, which is a structural block diagram of a device for allocating an uplink resource in accordance with one embodiment of the present disclosure. The device for allocating the uplink resource becomes all or part of the terminal 120 in FIG. 1 by hardware or a combination of hardware and software. The device includes a receiving unit 610 and an allocating unit 620

The receiving unit 610 is configured to receive a UL grant sent by a base station. The allocating unit 620 is configured to allocate, based on a transmission profile corresponding to a logical channel, an uplink resource indicated by the UL grant the receiving unit 610 receives to the logical channel. The transmission profile corresponding to the logical channel is allocated by the base station In a possible implementation mode, the allocating unit 620 includes a determining sub-unit 620 and an allocating sub-unit 622. The determining sub-unit 621 is configured to determine a transmission profile corresponding to the uplink resource indicated by the received UL grant. The allocating sub-unit 622 is configured to allocate, based on the transmission profile corresponding to the logical channel and the transmission profile corresponding to the uplink resource, an uplink resource indicated by the UL grant to the logical channel.

In some embodiments, the uplink resource indicated by each of the UL grants includes one or a plurality of time-frequency resource blocks. Each time-frequency resource block corresponds to one transmission profile.

In some embodiments, the determining sub-unit 621 is configured to acquire an identifier of a transmission profile corresponding to the uplink resource from the UL grant, and determine the transmission profile corresponding to the uplink resource based on the identifier of the transmission profile. Alternatively, the determining sub-unit 621 is configured to acquire a transmission profile parameter corresponding to the uplink resource from the UL grant, and determine the transmission profile corresponding to the uplink resource based on the acquired transmission profile parameter.

In some embodiments, the allocating unit 620 may further include a judging sub-unit 623 and a priority determining sub-unit 624. The judging sub-unit 623 is configured to judge whether a transmission profile corresponding to an uplink resource indicated by the UL grant belongs to a pre-allocated transmission profile set. The transmission profile set includes a transmission profile corresponding to the logical channel.

The priority determining sub-unit 624 is configured not to, if the judging sub-unit determines that the transmission profile corresponding to the uplink resource indicated by the UL grant does not belong to a pre-allocated transmission profile set, allocate an uplink resource corresponding to the transmission profile that does not belong to the transmission profile set, or determine a priority of the transmission profile that does not belong to the transmission profile set as a minimum priority.

In some embodiments, the logical channel corresponds to one or a plurality of transmission profiles.

In some embodiments, when the logical channel corresponds to one transmission profile, the allocating sub-unit is configured to, when a first uplink resource exists, and the quantity of the first uplink resource is larger than or equal to the quantity of resources required by a first logical channel, allocate an uplink resource to the first logical channel from the first uplink resource. The first uplink resource is an unallocated uplink resource of which a corresponding transmission profile is the same as a transmission profile corresponding to the first logical channel. The first logical channel is any one of the logical channels allocated with a corresponding transmission profile.

Further, the allocating sub-unit is further configured to, when the first uplink resource does not exist or the quantity of the first uplink resource is smaller than the quantity of resources required by the first logical channel, the uplink resource for whose allocation the first uplink resource is insufficient is allocated by any one of the following ways:

allocating an uplink resource to the first logical channel from a second uplink resource, wherein the second uplink resource is an unallocated uplink resource of which a priority of a corresponding transmission profile is higher than that of the transmission profile corresponding to the first logical channel; or allocating an uplink resource to the first logical channel from a third uplink resource, wherein the third uplink resource is an unallocated uplink resource of which a priority of a corresponding transmission profile is lower than that of the transmission profile corresponding to the first logical channel; or allocating an uplink resource to the first logical channel from a fourth uplink resource, wherein the fourth uplink resource is an unallocated uplink resource of which a priority of a corresponding transmission profile is equal to that of the transmission profile corresponding to the first logical channel; or stopping allocating an uplink resource to the first logical channel.

In some embodiments, when the logical channel corresponds to a plurality of transmission profiles, the allocating sub-unit is configured to, select and allocate an uplink resource corresponding to a transmission profile to a first logical channel in the order of priorities of a plurality of transmission profiles, from high to low, corresponding to the logical channel. The first logical channel is any one of the logical channels allocated with the corresponding transmission profile.

Further, the allocating sub-unit is further configured to: when the uplink resources corresponding to the plurality of transmission profiles corresponding to the logical channel are insufficient to meet the demand on the quantity of resources required by the logical channel, allocate an uplink resource to the logical channel by the following ways:

allocating an uplink resource corresponding to a transmission profile other than the transmission profile corresponding to the logical channel to the logical channel; or after allocating uplink resources, based on the plurality of corresponding allocated transmission profiles, to all the logical channels once, allocating an uplink resource corresponding to a transmission profile other than the transmission profile corresponding to the logical channel to the logical channel; or stopping allocating an uplink resource to the logical channel.

In some embodiments, the allocating unit is further configured to, allocate an uplink resource to a second logical channel in the order of the priority of the transmission profile corresponding to the uplink resource from high to low or from low to high. The second logical channel is a logical channel unallocated with the transmission profile.

In some embodiments, the allocating unit is further configured to allocate, based on a default transmission profile and a transmission profile corresponding to the uplink resource, an uplink resource to a second logical channel. The second logical channel is a logical channel unallocated with a corresponding transmission profile. The default transmission profile is pre-allocated by the base station.

In some embodiments, the receiving unit is further configured to receive transmission profile allocation information sent by a base station. The transmission profile allocation information includes at least one of indication information of a default transmission profile, indication information of a transmission profile set and indication information of a transmission profile corresponding to a logical channel. The indication information of the default transmission profile is configured to indicate a transmission profile preferentially used by a logical channel unallocated with a corresponding transmission profile. The transmission profile set includes a transmission profile corresponding to the logical channel.

Figure 7:
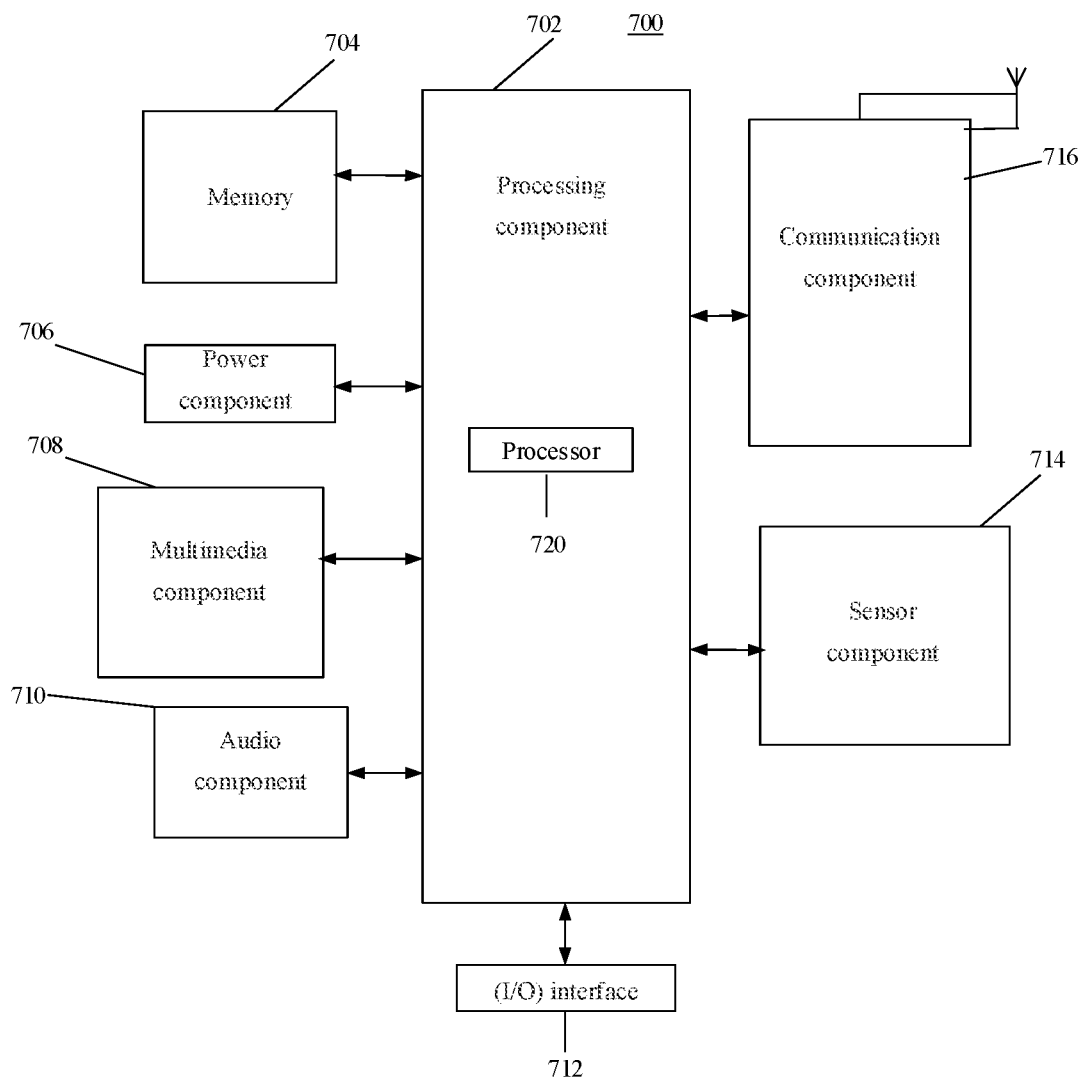
FIG. 7 is a structural block diagram of a terminal in accordance with one embodiment of the present disclosure.

Referring to FIG. 7, which is a schematic structural view of a terminal in accordance with one embodiment of the present disclosure. The terminal 700 is the terminal 120 in FIG. 1.

Referring to FIG. 7, the terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the terminal 700, such as the operations associated with display, telephone calls, data communications, camera operations, and recording operations. The processing component 702 may include one or more processors 820 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal 700. Examples of such data include instructions for any applications or methods operated on the terminal 700, contact data, phonebook data, messages, pictures, videos, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the terminal 700. The power component 706 may include a power management system, one or more power sources, and any other components associated with the generation, management, and distribution of power in the terminal 700.

The multimedia component 708 includes a screen providing an output interface between the terminal 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 708 includes a front camera and/or a rear camera. The front camera and the rear camera may receive external multimedia data while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive external audio signals when the terminal 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons may include, but are not limited to, a home button, a volume button, a start button, and a lock button.

The sensor component 714 includes one or more sensors to provide status assessments of various aspects of the terminal 700. For instance, the sensor component 714 may detect an on/off status of the terminal 700, relative positioning of components, e.g., the display device and the mini keyboard of the terminal 700, and the sensor component 714 may also detect a position change of the terminal 700 or a component of the terminal 700, presence or absence of user contact with the terminal 700, orientation or acceleration/deceleration of the terminal 700, and temperature change of the terminal 700. The sensor component 714 may include a proximity sensor configured to detect the presence of nearby objects without any physical contact. The sensor component 714 may also include a light sensor, such as a CMOS or CCD image sensor, used for imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal 700 and other devices. The terminal 700 can access a wireless network based on a communication standard, such as Wi-Fi, 2G, or 3G, or a combination thereof. In an exemplary embodiment, the communication component 716 receives broadcast signals or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 704 including instructions, executable by the processor 820 in the terminal 700, for performing the above-described methods. For example, the non-transitory computer-readable storage medium may be a ROM, a RAM, a CD-ROM, a magnetic tape, a floppy disc, an optical data storage device, and the like.

When the instruction in the non-temporary computer-readable storage medium is executed by the processor of the terminal, the terminal can execute a method for allocating an uplink resource. The method includes: receiving a UL grant sent by a base station; and allocating, based on a transmission profile corresponding to a logical channel, an uplink resource indicated by the UL grant to the logical channel. The transmission profile corresponding to the logical channel is allocated by the base station.

In some embodiments, said allocating, based on a transmission profile corresponding to a logical channel, an uplink resource indicated by the UL grant to the logical channel includes: determining a transmission profile corresponding to the uplink resource indicated by the received UL grant; and allocating, based on the transmission profile corresponding to the logical channel and the transmission profile corresponding to the uplink resource, an uplink resource indicated by the UL grant to the logical channel.

In some embodiments, the uplink resource indicated by each of the UL grants includes one or a plurality of time-frequency resource blocks. Each time-frequency resource block corresponds to one transmission profile. During implementation, the uplink resources in one UL grant may correspond to the same transmission profile or different transmission profiles.

In some embodiments, said determining a transmission profile corresponding to the uplink resource indicated by the received UL grant includes: acquiring an identifier of a transmission profile corresponding to the uplink resource from the UL grant, and determining, based on the identifier of the transmission profile, the transmission profile corresponding to the uplink resource. Alternatively, said determining a transmission profile corresponding to the uplink resource indicated by the received UL grant includes: acquiring a transmission profile parameter corresponding to the uplink resource from the UL grant, and determining, based on the acquired transmission profile parameter, the transmission profile corresponding to the uplink resource.

In some embodiments, said allocating, based on a transmission profile corresponding to a logical channel, an uplink resource indicated by the UL grant to the logical channel further includes:

judging whether a transmission profile corresponding to an uplink resource indicated by the UL grant belongs to a pre-allocated transmission profile set, wherein the transmission profile set includes a transmission profile corresponding to the logical channel; and if not, not allocating an uplink resource corresponding to the transmission profile that does not belong to the transmission profile set, or determining a priority of the transmission profile that does not belong to the transmission profile set as a minimum priority.

In a possible implementation mode of the present disclosure, the logical channel corresponds to one transmission profile. Said allocating, based on the transmission profile corresponding to the logical channel and the transmission profile corresponding to the uplink resource, an uplink resource indicated by the UL grant to the logical channel includes: when a first uplink resource exists, and the quantity of the first uplink resource is larger than or equal to the quantity of resources required by a first logical channel, allocating an uplink resource to the first logical channel from the first uplink resource. The first uplink resource is an unallocated uplink resource of which a corresponding transmission profile is the same as a transmission profile corresponding to the first logical channel. The first logical channel is any one of the logical channels allocated with a corresponding transmission profile.

Further, said allocating, based on the transmission profile corresponding to the logical channel and the transmission profile corresponding to the uplink resource, an uplink resource indicated by the UL grant to the logical channel further includes: when the first uplink resource does not exist or the quantity of the first uplink resource is smaller than the quantity of resources required by the first logical channel, the uplink resource for whose allocation the first uplink resource is insufficient is allocated by any one of the following ways:

allocating an uplink resource to the first logical channel from a second uplink resource, wherein the second uplink resource is an unallocated uplink resource of which a priority of a corresponding transmission profile is higher than that of the transmission profile corresponding to the first logical channel; or allocating an uplink resource to the first logical channel from a third uplink resource, wherein the third uplink resource is an unallocated uplink resource of which a priority of a corresponding transmission profile is lower than that of the transmission profile corresponding to the first logical channel; or allocating an uplink resource to the first logical channel from a fourth uplink resource, wherein the fourth uplink resource is an unallocated uplink resource of which a priority of a corresponding transmission profile is equal to that of the transmission profile corresponding to the first logical channel; or stopping allocating an uplink resource to the first logical channel.

In a possible implementation mode of the present disclosure, when the logical channel corresponds to a plurality of transmission profiles, said allocating, based on the transmission profile corresponding to the logical channel and the transmission profile corresponding to the uplink resource, an uplink resource indicated by the UL grant to the logical channel includes:

selecting and allocating an uplink resource corresponding to a transmission profile to a first logical channel in the order of priorities of a plurality of transmission profiles, from high to low, corresponding to the logical channel. The first logical channel is any of the logical channels allocated with the corresponding transmission profile.

Further, said allocating, based on the transmission profile corresponding to the logical channel and the transmission profile corresponding to the uplink resource, an uplink resource indicated by the UL grant to the logical channel includes:
  when the uplink resources corresponding to the plurality of transmission profiles corresponding to the logical channel are insufficient to meet the demand on the quantity of resources required by the logical channel, allocating an uplink resource to the logical channel by the following ways:
  allocating an uplink resource corresponding to a transmission profile other than the transmission profile corresponding to the logical channel to the logical channel; or after allocating uplink resources, based on the plurality of corresponding allocated transmission profiles, to all the logical channels once, allocating an uplink resource corresponding to a transmission profile other than the transmission profile corresponding to the logical channel to the logical channel; or stopping allocating an uplink resource to the logical channel.

In some embodiments, said allocating, based on the transmission profile corresponding to the logical channel and the transmission profile corresponding to the uplink resource, an uplink resource indicated by the UL grant to the logical channel further includes: allocating an uplink resource to a second logical channel in the order of the priority of the transmission profile corresponding to the uplink resource from high to low or from low to high. The second logical channel is a logical channel unallocated with a corresponding transmission profile.

In some embodiments, said allocating, based on a transmission profile corresponding to a logical channel and a transmission profile corresponding to the uplink resource, an uplink resource indicated by the UL grant to the logical channel further includes: allocating, based on a default transmission profile and a transmission profile corresponding to the uplink resource, an uplink resource to a second logical channel. The second logical channel is a logical channel unallocated with a corresponding transmission profile. The default transmission profile is pre-allocated by the base station.

In some embodiments, the method further includes: receiving transmission profile allocation information sent by a base station. The transmission profile allocation information includes at least one of indication information of a default transmission profile, indication information of a transmission profile set and indication information of a transmission profile corresponding to a logical channel. The indication information of the default transmission profile is configured to indicate a transmission profile preferentially used by a logical channel unallocated with a corresponding transmission profile. The transmission profile set includes transmission profiles corresponding to all the logical channels.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method for allocating an uplink resource, comprising:
receiving an uplink (UL) grant sent by a base station; and
allocating, based on a transmission profile corresponding to a logical channel, an uplink resource indicated by the UL grant to the logical channel, wherein the transmission profile corresponding to the logical channel is configured by the base station,
wherein in a case that the logical channel corresponds to one transmission profile, the allocating, based on the transmission profile corresponding to the logical channel and the transmission profile corresponding to the uplink resource, an uplink resource indicated by the UL grant to the logical channel comprises: upon that a first uplink resource exists, and the quantity of the first uplink resource is larger than or equal to the quantity of resources required by a first logical channel, allocating an uplink resource to the first logical channel from the first uplink resource, wherein the first uplink resource is an unallocated uplink resource of which a corresponding transmission profile is the same as a transmission profile corresponding to the first logical channel, and the first logical channel is any of the logical channels configured with a corresponding transmission profile,
wherein the allocating, based on a transmission profile corresponding to a logical channel, an uplink resource indicated by the UL grant to the logical channel further comprises: determining whether a transmission profile corresponding to an uplink resource indicated by the UL grant belongs to a pre-configured transmission profile set, wherein the transmission profile set comprises a transmission profile corresponding to the logical channel; and not allocating an uplink resource corresponding to the transmission profile that does not belong to the transmission profile set.

2. The method according to claim 1, wherein the transmission profile includes at least one of a subcarrier spacing or a transmission time interval (TTI) length.

3. The method according to claim 1, further comprising:
determining whether a transmission profile indicated by the UL grant belongs to a pre-configured transmission profile set, wherein the transmission profile set comprises a transmission profile corresponding to the logical channel.

4. The method according to claim 3, wherein the method further comprises:
determining the transmission profile indicated by the UL grant does not belong to a pre-configured transmission profile set;
skipping allocating an uplink resource corresponding to the transmission profile, the transmission profile does not belong to the transmission profile set.

5. The method according to claim 1, wherein a quantity of the uplink resource is larger than or equal to a quantity of resources required by the logical channel.

6. A terminal, comprising:
at least one processor; and
memory configured to store an instruction executable by the processor, wherein
the processor is configured to perform:
receiving an uplink (UL) grant sent by a base station; and
allocating, based on a transmission profile corresponding to a logical channel, an uplink resource indicated by the UL grant to the logical channel, wherein the transmission profile corresponding to the logical channel is configured by the base station, wherein in a case that the logical channel corresponds to one transmission profile, the allocating, based on the transmission profile corresponding to the logical channel and the transmission profile corresponding to the uplink resource, an uplink resource indicated by the UL grant to the logical channel comprises: upon that a first uplink resource exists, and the quantity of the first uplink resource is larger than or equal to the quantity of resources required by a first logical channel, allocating an uplink resource to the first logical channel from the first uplink resource, wherein the first uplink resource is an unallocated uplink resource of which a corresponding transmission profile is the same as a transmission profile corresponding to the first logical channel, and the first logical channel is any of the logical channels configured with a corresponding transmission profile, wherein the allocating, based on a transmission profile corresponding to a logical channel, an uplink resource indicated by the UL grant to the logical channel further comprises: determining whether a transmission profile corresponding to an uplink resource indicated by the UL grant belongs to a pre-configured transmission profile set, wherein the transmission profile set comprises a transmission profile corresponding to the logical channel; and not allocating an uplink resource corresponding to the transmission profile that does not belong to the transmission profile set.

7. The terminal according to claim 6, wherein the transmission profile includes at least one of a subcarrier spacing or a transmission time interval (TTI) length.

8. The terminal according to claim 6, wherein processor is configured to perform:
   determining whether a transmission profile indicated by the UL grant belongs to a pre-configured transmission profile set, wherein the transmission profile set comprises a transmission profile corresponding to the logical channel.

9. The terminal according to claim 8, wherein processor is configured to perform:
   determining the transmission profile indicated by the UL grant does not belong to a pre-configured transmission profile set;
   skipping allocating an uplink resource corresponding to the transmission profile, the transmission profile does not belong to the transmission profile set.

10. The terminal according to claim 9, wherein a quantity of the uplink resource is larger than or equal to a quantity of resources required by the logical channel.

11. A non-transitory computer-readable storage medium comprising instructions which, when executed by a processor in a terminal, cause the processor to perform the method according to claim 1.

12. The non-transitory computer-readable storage medium according to claim 11, wherein the transmission profile includes at least one of a subcarrier spacing or a transmission time interval (TTI) length.

* * * * *